US008705613B2

(12) United States Patent
Chou et al.

(10) Patent No.: US 8,705,613 B2
(45) Date of Patent: Apr. 22, 2014

(54) ADAPTIVE JOINT SOURCE CHANNEL CODING

(75) Inventors: Jim Chen Chou, San Jose, CA (US); Ali Jezu Tabatabai, Cupertino, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 2321 days.

(21) Appl. No.: 10/877,589

(22) Filed: Jun. 25, 2004

(65) Prior Publication Data

US 2005/0031039 A1 Feb. 10, 2005

Related U.S. Application Data

(60) Provisional application No. 60/482,967, filed on Jun. 26, 2003, provisional application No. 60/514,350, filed on Oct. 24, 2003, provisional application No. 60/530,079, filed on Dec. 16, 2003, provisional application No. 60/569,485, filed on May 7, 2004.

(51) Int. Cl.
*H04N 7/12* (2006.01)

(52) U.S. Cl.
USPC .................................................. 375/240.01

(58) Field of Classification Search
USPC ............. 375/240.12, 240.13, 240.16, 240.15, 375/240.25
IPC ....................................................... H04N 7/12
See application file for complete search history.

(56) References Cited

U.S. PATENT DOCUMENTS

| | | | |
|---|---|---|---|
| 5,355,379 A | | 10/1994 | Hobson et al. |
| 5,408,234 A | * | 4/1995 | Chu ............................. 341/106 |
| 5,477,221 A | * | 12/1995 | Chang et al. .................... 341/51 |
| 5,548,598 A | | 8/1996 | Dupont |
| 5,724,369 A | * | 3/1998 | Brailean et al. ................ 714/747 |
| 5,745,504 A | * | 4/1998 | B.ang.ng ........................ 714/752 |
| 5,847,776 A | | 12/1998 | Khmelnitsky et al. |
| 5,867,221 A | * | 2/1999 | Pullen et al. ............. 375/240.16 |
| 5,995,171 A | | 11/1999 | Enari et al. |
| 6,046,774 A | * | 4/2000 | Heo et al. ................ 375/240.16 |
| 6,243,846 B1 | | 6/2001 | Schuster et al. |
| 6,414,994 B1 | | 7/2002 | Hazra |
| 6,421,464 B1 | | 7/2002 | Tran et al. |
| 6,487,690 B1 | | 11/2002 | Schuster et al. |

(Continued)

OTHER PUBLICATIONS

Geoffrey Davis and John Danskin, "Joint Source and Channel Coding for Image Transmission Over Lossy Packet Networks", cs.Dartmouth.edu, Aug. 5, 1996.

(Continued)

*Primary Examiner* — Tung Vo

(74) *Attorney, Agent, or Firm* — Blakely, Sokoloff, Taylor & Zafman LLP

(57) ABSTRACT

Adaptive joint source channel coding associates multiple predictors with a reference data unit, such as a macroblock or frame of video data. An encoder determines a sub-codebook in which each of the selected multiple predictors decodes to the reference data unit. An identifier for the sub-codebook is transmitted through a channel to a decoder for subsequent decoding of the reference data unit. The reference data unit itself does not need to be sent. The multiple predictors are contained within a decoding region and the identifier for the sub-codebook specifies the decoding region. The decoder uses the identified sub-codebook and one of the predictors to decode the reference data unit. If none of the original predictors are correctly received, different types of error handling are employed based on the type of channel.

63 Claims, 13 Drawing Sheets

(56) References Cited

U.S. PATENT DOCUMENTS

| | | | |
|---|---|---|---|
| 6,553,147 B2 * | 4/2003 | Chai et al. | 382/240 |
| 6,574,218 B1 | 6/2003 | Cooklev | |
| 6,584,226 B1 * | 6/2003 | Chaddha et al. | 382/236 |
| 6,701,021 B1 * | 3/2004 | Qian et al. | 382/253 |
| 6,721,362 B2 * | 4/2004 | Lin et al. | 375/240.27 |
| 6,724,940 B1 * | 4/2004 | Qian et al. | 382/253 |
| 6,731,807 B1 * | 5/2004 | Pazmino et al. | 382/232 |
| 6,859,498 B1 * | 2/2005 | Choi | 375/240.27 |
| 6,894,628 B2 * | 5/2005 | Marpe et al. | 341/107 |
| 6,917,648 B1 * | 7/2005 | Morimatsu et al. | 375/240.01 |
| 6,983,018 B1 * | 1/2006 | Lin et al. | 375/240.16 |
| 7,023,913 B1 | 4/2006 | Monroe | |
| 7,162,091 B2 * | 1/2007 | Wang et al. | 382/233 |
| 7,239,662 B2 * | 7/2007 | Horowitz et al. | 375/240.24 |
| 7,292,731 B2 * | 11/2007 | Sekiguchi et al. | 382/238 |
| 7,295,614 B1 * | 11/2007 | Shen et al. | 375/240.25 |
| 7,317,839 B2 * | 1/2008 | Holcomb | 382/236 |
| 7,400,684 B2 * | 7/2008 | Hannuksela et al. | 375/240.27 |
| 7,400,774 B2 | 7/2008 | Puri et al. | |
| 7,639,739 B2 * | 12/2009 | Rose et al. | 375/240.01 |
| 2004/0136455 A1 * | 7/2004 | Akhter et al. | 375/240 |

OTHER PUBLICATIONS

Aria Nosratinia, Jin Lu and Behnaam Aazhang, "Source-Channel Rate Allocation for Progressive Transmission of Images", IEEE International Conference on Image Processing, Chicago, IL, USA, 1998.

* cited by examiner

ADAPTIVE JOINT SOURCE CHANNEL CODING

RELATED APPLICATIONS

This application is related to and claims the benefit of U.S. Provisional Patent applications 60/482,967 filed Jun. 26, 2003, 60/514,350 filed Oct. 24, 2003, which are hereby incorporated by reference. This application is also related to and claims the benefit of U.S. Provisional Patent applications 60/530,079, filed Dec. 16, 2003 and 60/569,485, filed May 7, 2004.

FIELD OF THE INVENTION

This invention relates generally to encoding and decoding of correlated data, and. more particularly to the use of channel coding for both compression and resiliency.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2003, Sony Corporation Inc., All Rights Reserved.

BACKGROUND OF THE INVENTION

A well-known problem that exists for transmitting compressed correlated data, such as video, over a noisy channel is drift or error propagation. Using video as an example, in the traditional coding paradigm, the first frame of video is encoded independently and successive video frames are encoded by taking the difference between the current and the immediately preceding frames. This source coding reduces the number of bits required to transmit the video but the loss or corruption of a single frame can cause errors to be propagated to many successive frames. Channel coding is frequently used to reduce the magnitude of source coding errors by introducing redundancy into the transmitted data.

A video frame is defined to be an m×n array of values where m and n are dimensions of the video frame and each value is denoted as a coefficient. A macroblock is defined to be a subset of the video frame and can consist of any number of coefficients, from one value to the whole set of m×n values defined to be the video frame. Furthermore the subset of coefficients that constitute the macroblock may be operated on by a mathematical transformation to result in a new set of coefficients, as long as the mathematical transformation is invertible so that the original set of coefficients may be recovered. In this invention, the term macroblock will be used to refer to either the original or transformed coefficients. Referring to FIG. 1, the macroblock, can be visualized as a point in an n-dimensional coefficient space, in this case a three-dimensional space. The difference 111, often referred to as a "residual" or "residual error," between the coefficients of a reference macroblock 107 and a closely correlated predictor macroblock 109 is encoded and sent with the predictor macroblock from an encoder 101 to a decoder 105. If the predictor macroblock 109 is lost or corrupted in a communication channel 103, and the encoded residual error 111 is not lost then the decoder 105 can first perform error concealment by attempting to determine an estimate of the lost predictor macroblock 113 and then add the residual error 111 to the estimated predictor macroblock to obtain an estimate of the reference macroblock 115. Because the estimated predictor 113 is unlikely to be identical to the original predictor 109, there will be a difference 117 between the reference macroblock 107 and the reconstructed reference macroblock 115. This difference, or drift error, will then be propagated to successive frames.

SUMMARY OF THE INVENTION

Adaptive joint source channel coding associates multiple predictors with a reference data unit, such as a macroblock or frame of video data. An encoder determines a sub-codebook in which each of the selected multiple predictors decodes to the reference data unit. An identifier for the sub-codebook is transmitted through a channel to a decoder for subsequent decoding of the reference data unit. The reference data unit itself does not need to be sent. The multiple predictors are contained within a decoding region and the identifier for the sub-codebook specifies the decoding region. The decoder uses the identified sub-codebook and one of the predictors to decode the reference data unit. If none of the original predictors are correctly received, different types of error handling are employed based on the type of channel.

The present invention is described in conjunction with systems, clients, servers, methods, and machine-readable media of varying scope. In addition to the aspects of the present invention described in this summary, further aspects of the invention will become apparent by reference to the drawings and by reading the detailed description that follows.

DETAILED DESCRIPTION OF THE INVENTION

Figure 1:
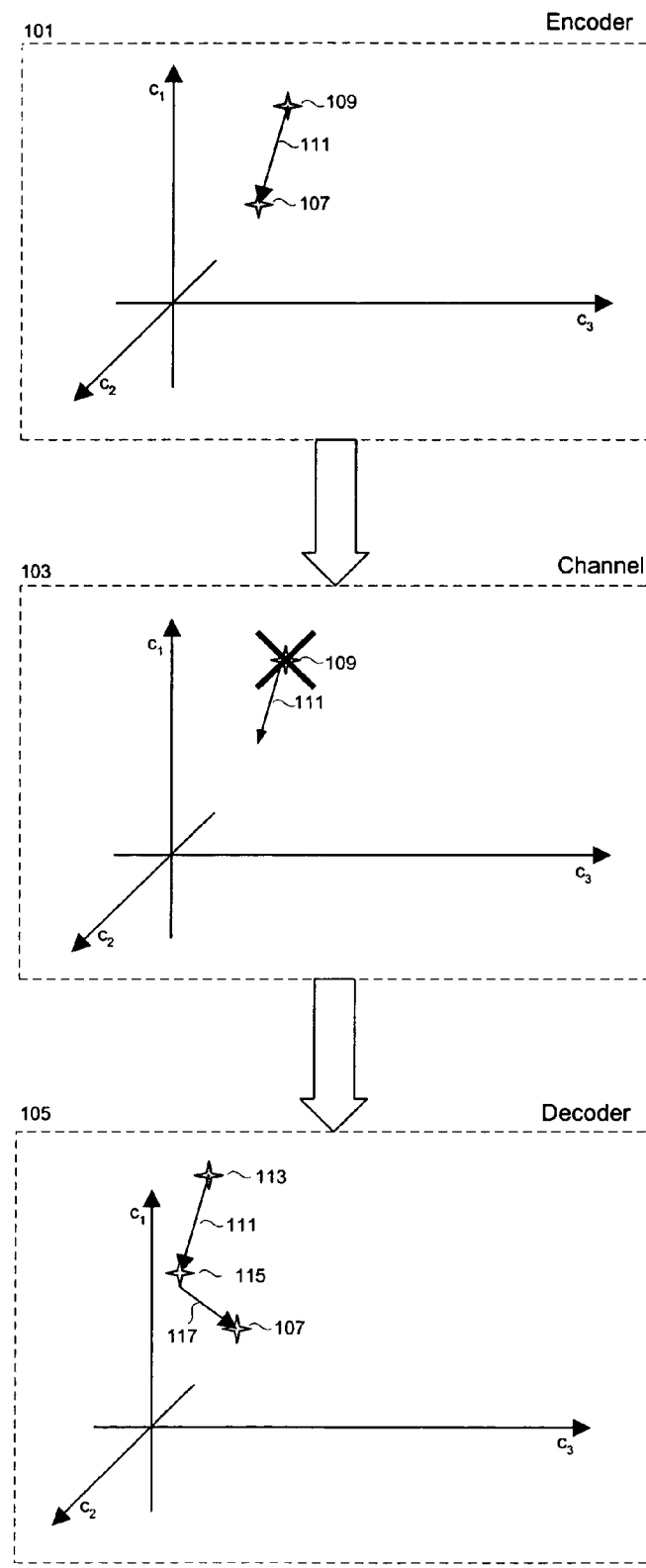
FIG. 1 is a diagram illustrating prior art coding and decoding with transmission errors.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

A system level overview of the operation of an embodiment of encoding and decoding according to the present invention is described with reference to FIG. 2A. The encoding and decoding may be applied to any type of correlated data, such as moving images and audio, and operates on units of correlated data, such as frames or macroblocks of a video stream. For clarity, embodiments of the invention are generally described in conjunction with video macroblocks but the encoding and decoding operations are equally applicable to other data units and types of correlated data. A reference data unit depends on several preceding data units ("predictors") so that only one of the predictors need be received without error to correctly decode the reference data unit. The location of the multiple predictors 209, 211, 213, 215 within an n-dimensional coordinate space defines a decoding region, shown as sphere 219, with a reference macroblock 207 at the center. The radius 217 of the decoding sphere is encoded at the encoder 201 instead of the residual of each predictor. In one embodiment, the radius 217 is encoded by partitioning a codebook to produce a sub-codebook with a granularity that causes each predictor 209, 211, 213, 215 within the decoding sphere 219 to decode to the reference macroblock 207. An identifier for the sub-codebook is sent to the decoder 205 as the encoded value for the radius 217. Even if the best predictor 209 is lost or corrupted in the channel, 203, the decoder 205 can use the sub-codebook and any one of the received predictors, e.g. 211, 213, that fall within the decoding sphere 219 to reconstruct to the reference macroblock 207.

If all of the predictors 209, 211, 213, 215 are lost, the decoder 205 can perform error concealment by forming an estimate for the lost predictors and use a weighted combination of the estimates as the predictor. If enough redundancy is available in the encoded stream, a correct decoding can be achieved if the estimated predictor falls within the decoding region.

Postprocessing can be performed on the reconstructed frames. If X represents the macroblock to be encoded and $Y_i$ represents the $i^{th}$ predictor, then the reconstructed value can be improved by estimating it as:

$$X'=E[X|Y_1, Y_2, \ldots, Y_n] \quad (1)$$

A closed form solution may be attained for the reconstruction assuming a statistical distribution on X and $Y_1, Y_2, \ldots, Y_n$.

If feedback is available about the channel 203, both the encoder 201 and decoder 205 can maintain the state of decoding, and the encoder 201 can choose to use predictors that it knows the decoder 205 has received. Furthermore, the encoder 201 does not need to retransmit an entire identifier to specify an additional, new predictor but only needs to transmit a supplemental identifier to expand the decoding sphere 219 to include the new predictor. As an example, assume that X can be recovered from three predictors, $Y_1$, $Y_2$ and $Y_3$, that all three predictors are lost, and that the decoder has received the identifier for the sub-codebook that includes $Y_1$, $Y_2$ and $Y_3$. After the encoder learns from the decoder that all three predictors are lost, the encoder does not need to send the entire identifier that specifies the sub-codebook necessary to recover X from a fourth predictor, $Y_4$, but only needs to expand the identifier so that the decoding region encompasses $Y_4$. Non-real time video transmission for feedback channels can benefit from this embodiment.

In addition to providing resiliency, it will be appreciated that data can be compressed by sending the codebook identifier that specifies a decoding region instead of the difference between macroblocks. Using the identifier for the decoding region to provide both compression and resiliency requires a tradeoff between the two. As illustrated in FIG. 2B, for reference macroblock 207, the decoding sphere 221 having radius 223 encompasses only the best predictor 209. Since the best predictor 209 is most closely correlated with the reference macroblock, the granularity of the codebook will be finer and thus the compression will be greater but will provide little resiliency. On the other hand, a decoding sphere 219 having radius 217 encompasses the second 211, third 213 and fourth 215 best predictors in addition to the best predictor 209, and therefore requires a coarser granularity codebook, resulting in less compression while providing greater resiliency. Thus, the identifier serves a dual function. First, the identifier is used as the compressed representation of the reference macroblock. Second, the identifier is used by the decoder to identify a decoding region, where any predictor that falls within the decoding region can be used to correctly decode the reference macroblock. This allows for robustness, because only one predictor that falls within the decoding region needs to be present at the decoder in order for the reference macroblock to be correctly decoded.

In one embodiment, the appropriate decoding region is selected by determining the maximum expected error. Assuming three predictors, $Y_1$, $Y_2$, and $Y_3$, for a given reference macroblock $X_i$, then $Y_{1,i}=X_i+e_{1,i}$, $Y_2=X_i+e_{2,i}$, and $Y_3=X_i+e_{3,i}$. The corresponding maximum error is $$\max_j(|e_{j,i}|) \quad (2)$$

The encoder sends the identifier of a sub-codebook that correctly decodes any predictor within the maximum error to the reference macroblock.

In the case where the statistics of the channel error characteristics are known, the number of bits that are transmitted onto the channel may be minimized by selecting the optimal mode for each macroblock. The problem can be posed as minimizing the expected distortion given a rate-constraint R and channel error statistics. This constrained optimization problem can be solved by minimizing the lagrangian:

$$J=E[D]+\lambda R \quad (3)$$

where E[D] is the expected distortion with respect to the channel error statistics. The optimal mode is the mode that minimizes the lagrangian:

$$\text{Optimal mode}=\operatorname{argmin}_i(E[D_i]+\lambda R_i) \quad (4)$$

where i represents the available encoding modes. In one embodiment, the available modes include the traditional intra-frame, inter-frame, forward error correction (FEC) modes, and the joint source channel (JSC) coding mode of the present invention. The expected distortion can be calculated analytically or empirically by simulating channel loss during the process of coding the data.

Figure 3:
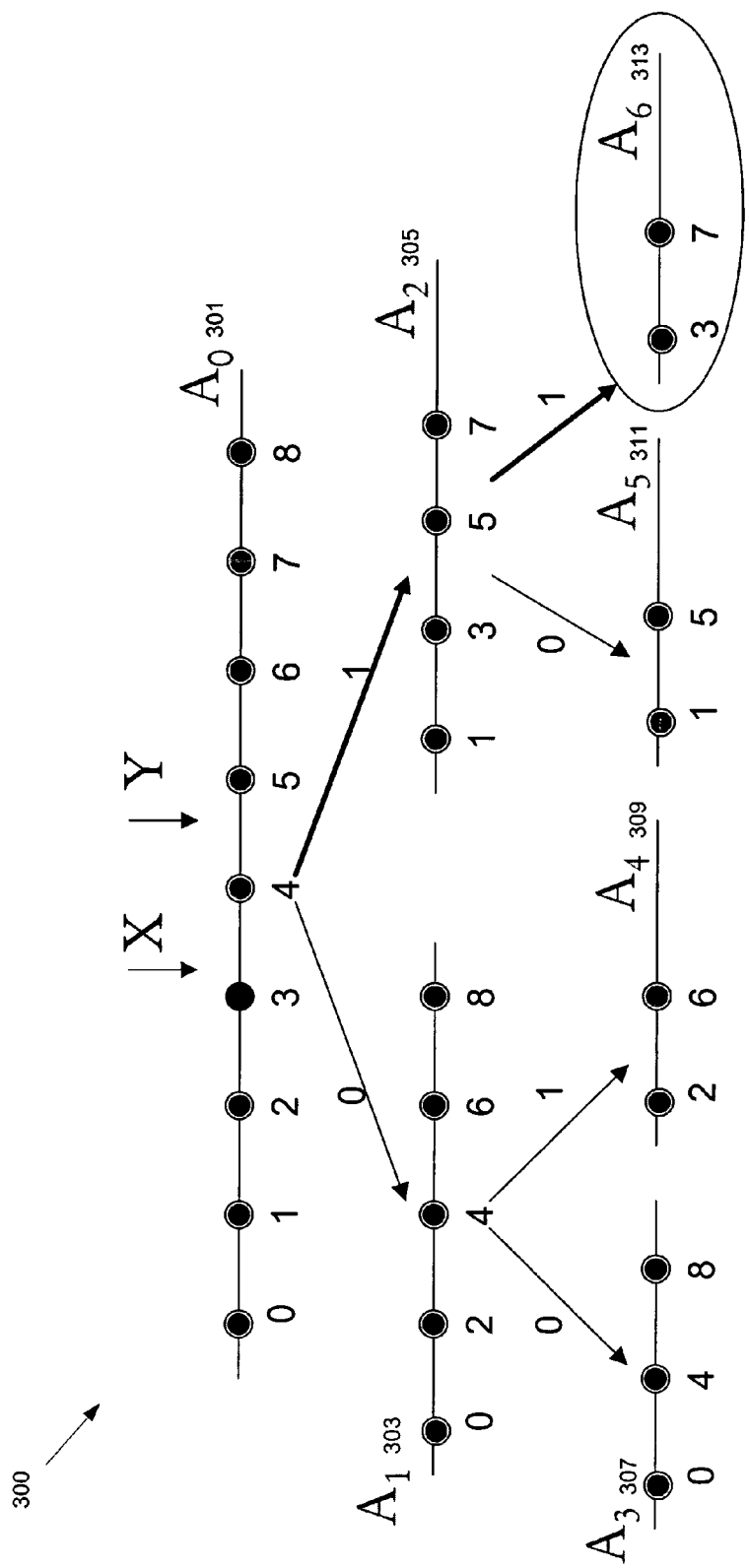
FIG. 3 is a diagram illustrating an embodiment of a code construction for use with the invention.

In one embodiment, the codebook is based on lattice partitions, shown as a hierarchical tree 300 in FIG. 3. At the root level, or node, 301, the spacing, or step size, between codepoints is $\Delta$, and at each subsequent level i, or leaf node, the spacing is $2^i\Delta$. The root node 301 is used to perform quantization on the coefficients of the reference macroblock and the leaf nodes 303, 305, 307, 309, 311, 313 are used to channel decode the multiple predictors to the codepoint that represents the quantized value of the reference macroblock. The bits that specify the path to the particular leaf node in the tree are used as the identifier for the decoding region that includes all the predictors. The path should be such that the leaf node contains the quantized value that is specified by the root node. Referring to FIG. 3 and using a single predictor for clarity, assume a coefficient X=−2.8 for a reference macroblock and the corresponding coefficient Y=−0.2 for the best predictor macroblock. Assuming $\Delta$=1.5, with codepoints ranging from −7.5 to +4.5, the value of the closest codepoint to X at the root level 301 is −3, which corresponds to codepoint 3. The closest codepoint to Y at the root level is 0, which corresponds to codepoint 5. The sub-codebook at leaf node 313 will decode Y to the quantized value of X, i.e., −3, and the bits (11) that specify the path from the root node 301 to leaf node 313, illustrated by the darker arrows in FIG. 3, are used as the encoded value for the radius of the decoding sphere.

Prefix coding is combined with the structure of FIG. 3 so that a variable number of levels can be used in the encoding and a uniquely decodable sequence can be achieved. In one embodiment, an identifier will be specified as N ones (or zeros) followed by a zero (or a one) and the bits that specify the path in the tree. The value of N may represent the number of levels used but can also be tuned to optimize the rate-distortion performance. This type of prefix coding is similar to Golomb coding.

As an example, assume the coefficient, X=0.1, in a macroblock is to be encoded. Assuming the step size at the root level is 0.5, X will be quantized to the codepoint that corresponds to zero. All of the possible predictors from various macroblocks in the previous frames are determined and one or more decoding spheres defined. Assuming a decoding region that encompasses three predictors, $Y_1$=0.3, $Y_2$=0.5 and $Y_3$=1.2, a sub-codebook is selected in which the value for all three of the predictors fall within the decoding range of zero, i.e., the quantized value of X. Therefore, a step size of 4 at the leaf node, or three levels, is required for all three predictors to decode to zero. The encoded value of the decoding sphere radius might be 1110000, where 111 instructs the decoder to decode on the third level, and 000 instructs the decoder to use the codebook at location 000 in the tree. In general, if a step size of $2^i\Delta$ is needed, where $\Delta$ represents the step size in the root codebook, then i levels will be needed. In addition, it should be noted that even if only a step size of $2^i\Delta$ is needed, one might choose to use a step size of $2^{i+1}\Delta$ instead so that an identifier does not need to be allocated for the level containing the spacing of $2^i\Delta$. For example, if one chooses not to code the first level, then the identifiers will be:

0—no coding necessary (i.e., use 0-level for decoding)
1000
1001
1010
1011
110000
110001
110010
. . .

so that all predictors that are within $2\Delta$ of the quantized value will use the second level for decoding. This leads to one less prefix bit to code the second level versus using N (where N represents the number of levels) bits to specify the level. Therefore the expected number of bits to be used can be minimized based on the probability distribution of the correlation noise between the predictors and the quantized value. While adaptive joint source channel coding has been described as using predictors selected from prior frames, one of skill in the art will recognize that future frames can be used as one or more of the predictors. In this case additional predictors can be garnered from future frames, and the encoder and decoder will maintain the aforementioned functionality. Furthermore, spheres have been used as examples of multi-dimensional decoding regions but the use of other multi-dimensional shapes is considered within the scope of the invention.

Figure 2A:
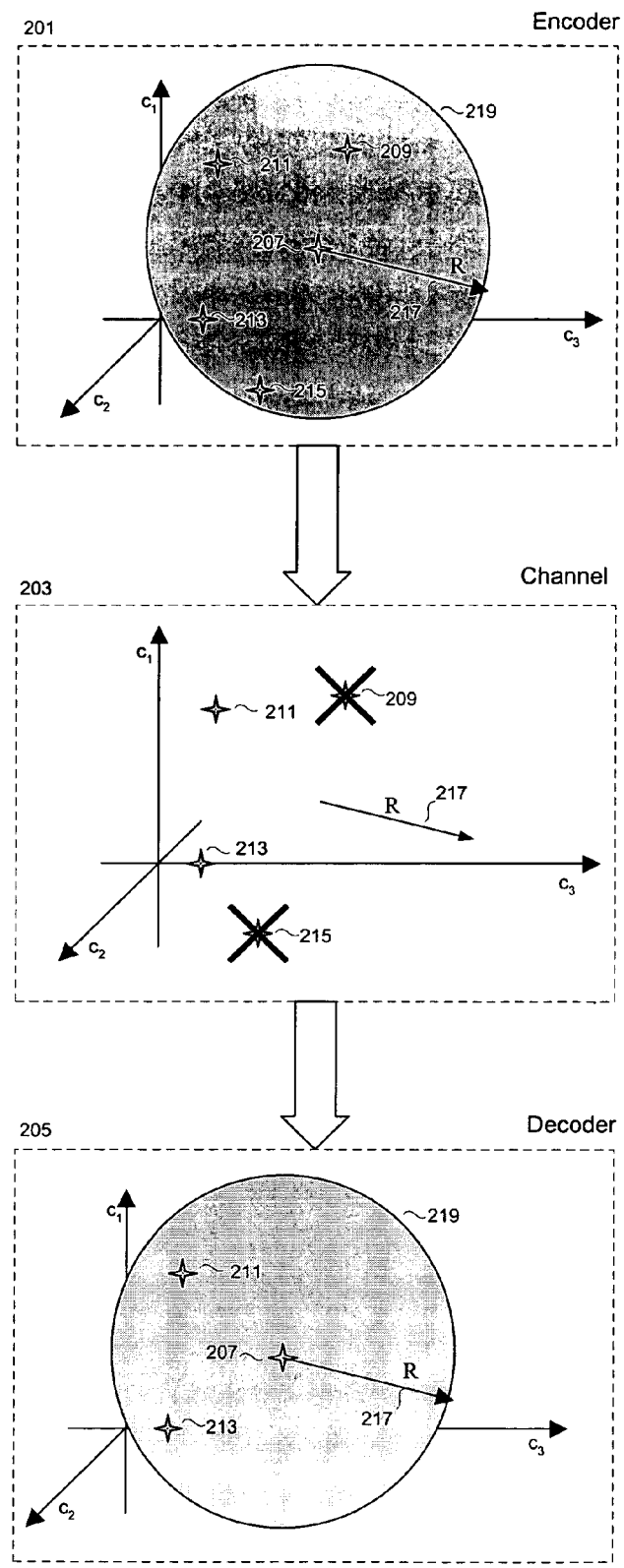
FIG. 2A is a diagram illustrating a system-level overview of an embodiment of the invention.
Figure 2B:
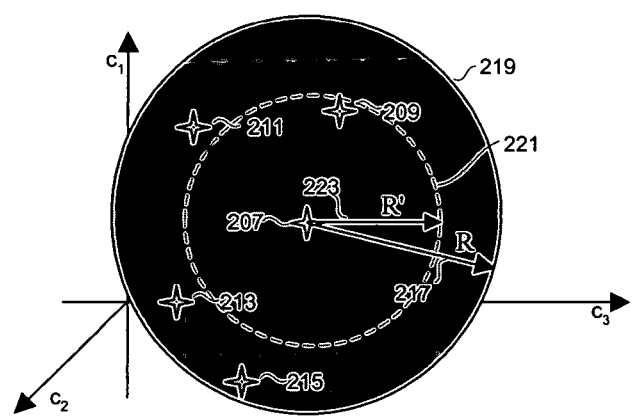
FIG. 2B is a diagram illustrating an alternate embodiment of the invention.

One embodiment of an adaptive joint source channel encoding method 400 to be performed by an encoder, such as encoder 201 of FIG. 2A, is described with reference to a flow diagram shown in FIG. 4A. A corresponding decoding method 430 to be performed by a decoder, such as decoder 205 of FIG. 2A, is described with reference to a flow diagram shown in FIG. 4B.

Figure 4A:
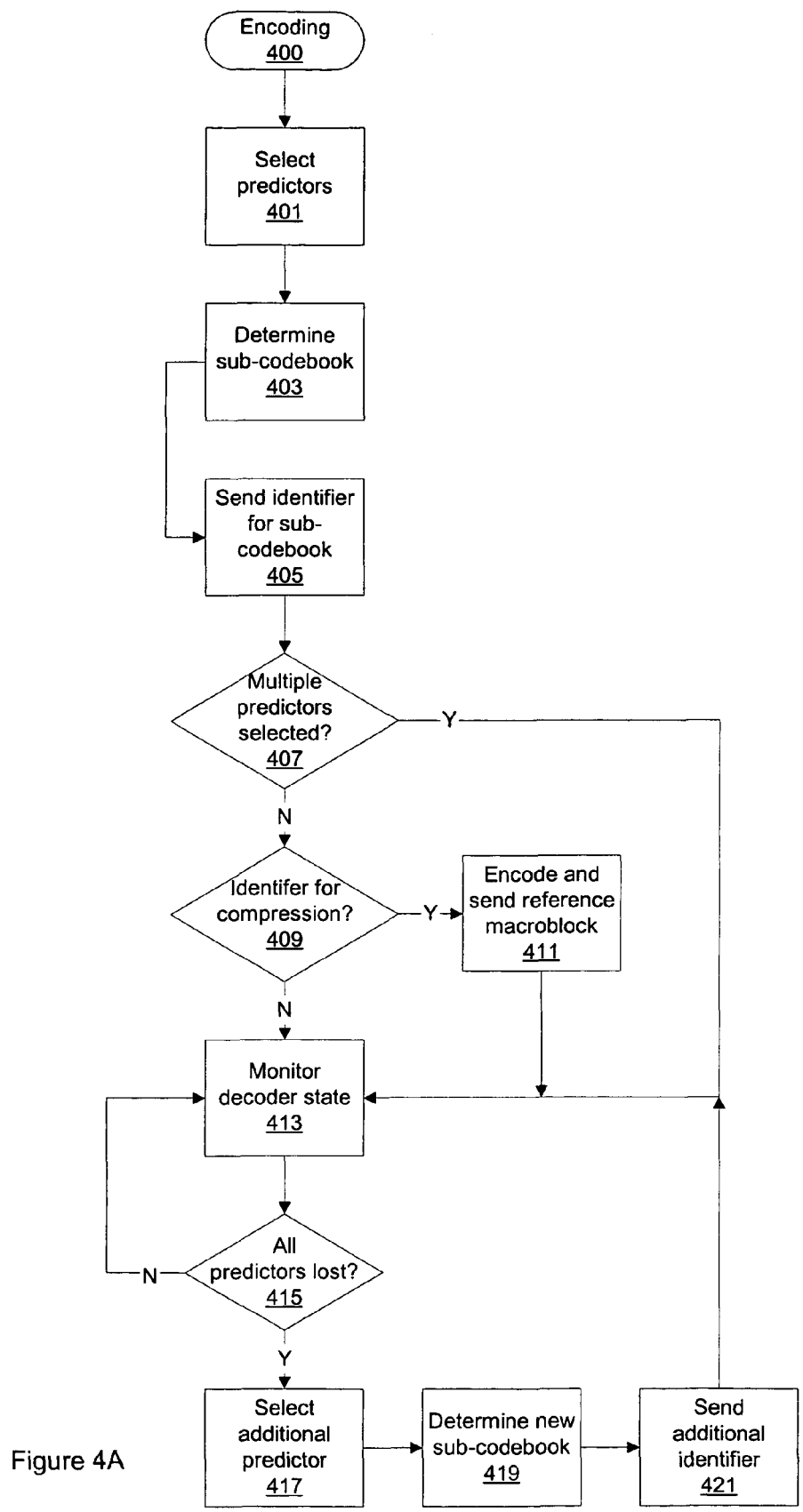
FIGS. 4A-B are flow diagrams of methods to be performed to encode and decode data according to an embodiment of the invention.

Referring first to FIG. 4A, the adaptive joint source channel encoding method 400 selects the predictors for the current reference macroblock from previously sent macroblocks (block 401). As described above, selecting more predictors will provide more resiliency but less compression than selecting fewer, so the selection at block 401 is based on various factors that determine whether compression or resiliency is more important for the channel. An agreed-upon codebook is partitioned until a sub-codebook is created that has a decoding region that maps each of the predictor coefficients to the same value that each of the coefficients of the reference macroblock is mapped to in the root codebook (block 403). The identifier for the appropriate sub-codebook is sent to the decoder (block 405). If multiple predictors have been selected (block 407), the identifier is also the compressed representation of the reference macroblock so no additional information must be sent to the decoder. If only a single predictor is within the decoding region and the identifier is not the compressed representation (block 409), the reference macroblock is encoded and sent to the decoder at block 411. In an alternate embodiment for a feedback channel, the encoding method 400 monitors the state of the decoder (block 413) and selects at least one additional predictor at block 417 if all the previously selected predictors have been lost or corrupted (block 415). The encoding method 400 determines a new sub-codebook that contains the additional identifier (block 419) and sends an additional identifier for the new sub-codebook to the decoder (block 421). As described above, the additional identifier may be a supplemental identifier that combines with the identifier for the previously selected predictors, or it may be the entire identifier for a different sub-codebook.

Figure 4B:
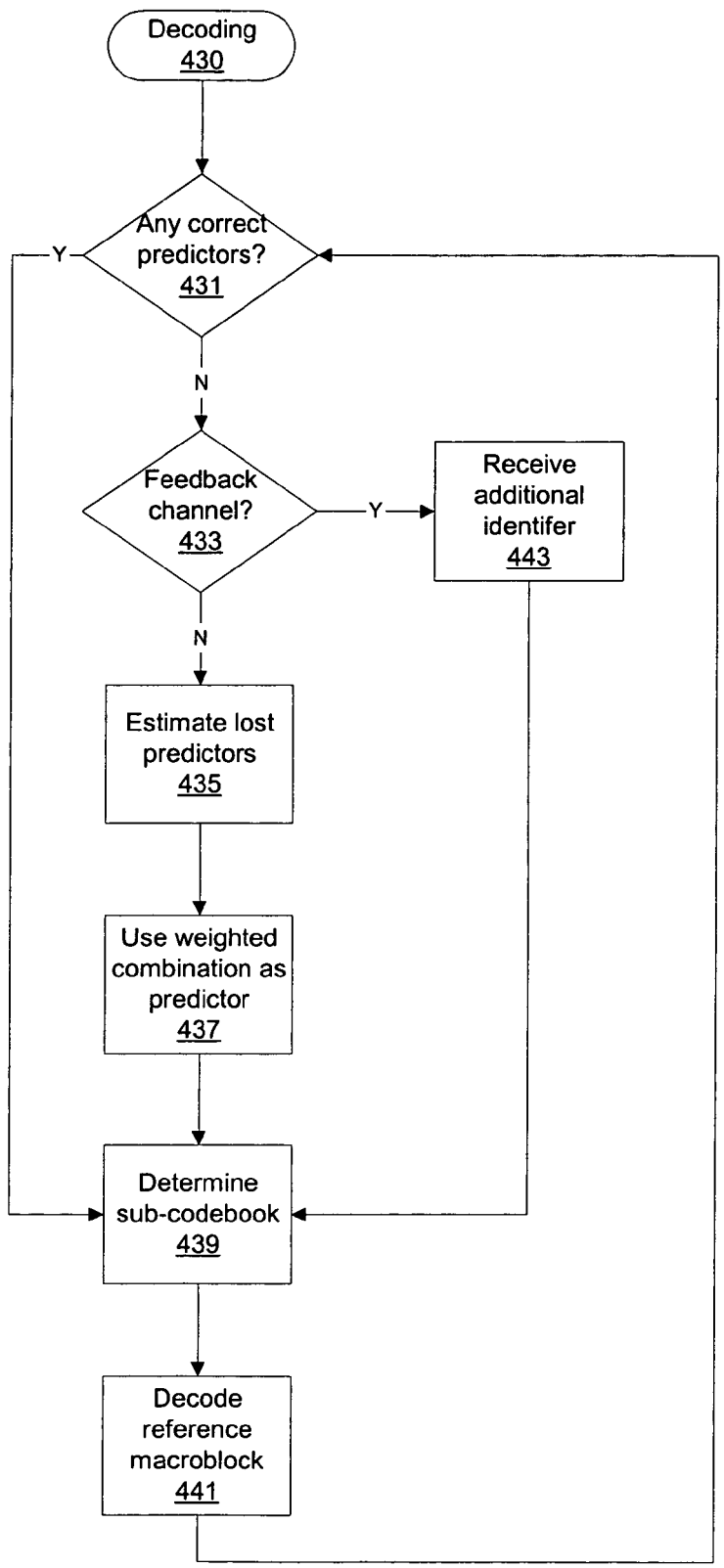

Turning now to FIG. 4B, the decoding method 430 is invoked when either the reference macroblock is lost or corrupted or when the identifier is used as the compressed representation of the reference macroblock. Assuming at least one predictor is received correctly (block 431), decoding method 430 determines the correct sub-codebook using the received identifier (block 439) and uses it to decode the predictor to the value of the reference macroblock (block 441). If all the predictors have been lost or corrupted and the channel is not a feedback channel (block 433), the decoding method 430 estimates the values of the lost/corrupted predictors (block 435) and uses a weighted combination of the estimated values as the predictor value (block 437) as described above. In an alternate embodiment for a feedback channel, the encoder will receive an additional identifier from the encoder (block 443), which enlarges the decoding region and determines the correct sub-codebook at block 439. As noted above, the additional identifier may be a supplemental identifier or an entire identifier.

It will be appreciated that the determination that a reference or predictor macroblock is lost or corrupted may be made according to any well-known methodology. In one embodiment, when the stream of macroblocks is represented by a codeword created using arithmetic coding, a forbidden symbol is used to detect errors. The forbidden symbol will never be encoded, so if the decoder detects the forbidden symbol in the stream, the decoder recognizes there has been an error. As described in co-pending U.S. patent application Ser. No. 10/877,819, which is co-filed with, and assigned to the same assignees, as the present application, given a probability of c that the forbidden symbol will occur within the stream, the decoding time between the occurrence of the error and the decoding of the forbidden symbol on average is $1/\epsilon$. Thus, if the decoder decodes the forbidden symbol, the previous $1/\epsilon$ bits are likely to be corrupted and the decoder can proceed with recovering the reference macroblock as described above.

In practice, the methods described herein may constitute one or more programs made up of machine-executable instructions. Describing the method with reference to the flow diagrams in FIGS. 4A-B enables one skilled in the art to develop such programs, including such instructions to carry out the operations (acts) represented by the logical blocks on suitably configured machines (the processor of the machine executing the instructions from machine-readable media). The machine-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine causes the processor of the machine to perform an action or produce a result. It will be further appreciated that more or fewer processes may be incorporated into the methods illustrated in FIGS. 4A-B without departing from the scope of the invention and that no particular order is implied by the arrangement of blocks shown and described herein.

Particular implementations of the invention are now described in conjunction with FIGS. 5A-B, 6A-B, 7A-B, 8, 9 and 10.

Figure 5A:
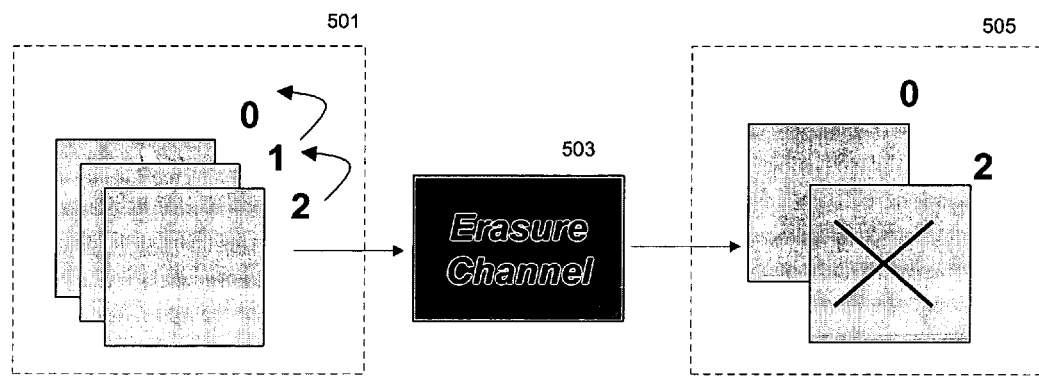
FIGS. 5A-B are diagrams of contrasting the prior art and an embodiment of the invention implemented for a lossy channel.
Figure 5B:
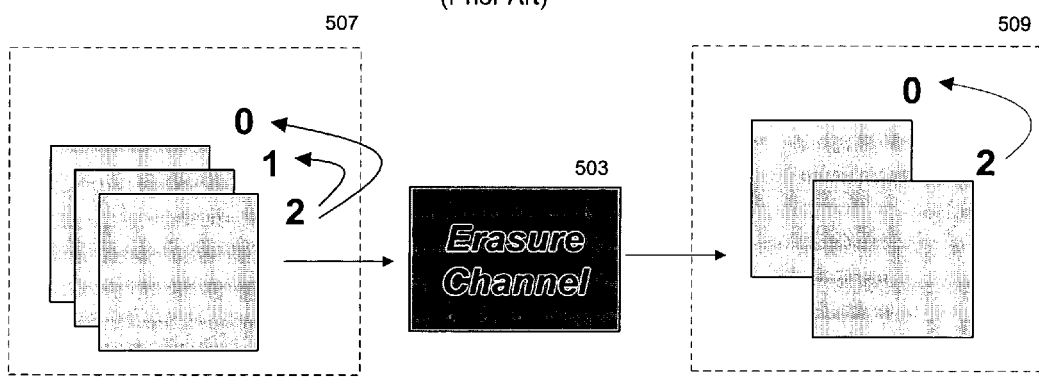

FIG. 5A illustrates the transmission of frames from a prior art encoder 501 through an erasure channel 503, such as the Internet, to a decoder 505. Assuming that frame 2 depends on frame 1, if frame 1 is lost or corrupted, frame 2 cannot be decoded. In contrast, FIG. 5B illustrates the transmission of frames from a encoder 507 that incorporates the adaptive joint source channel coding of the present invention. If frame 1 is lost or corrupted in the erasure channel 503, the corresponding decoder 509 can use frame 0 to decode frame 2.

Figure 6A:
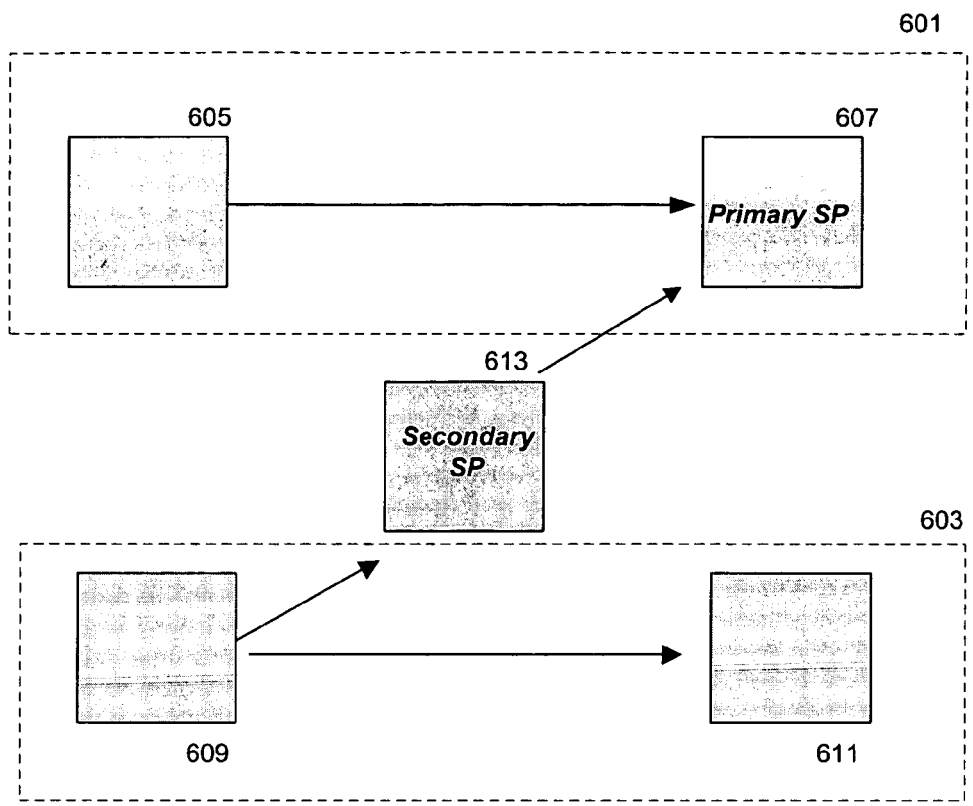
FIGS. 6A-B are diagrams contrasting the prior art and an embodiment of the invention implemented for bit-rate switching and SNR scalability.

FIG. 6A illustrates the prior art process of switching between video streams having different bit rates. In general, the subsequent frames in a stream are only dependent upon prior frames in the same stream, e.g. in stream 601, frame 607 depends on frame 605 while in stream 603, frame 611 depends on frame 609. In order to enable a frame in one stream to be reconstructed from a frame in a different stream, special switch picture (SP) points must be defined for the decoder to be able to decode the switched stream. As shown, frame 607 is defined as a primary SP that can be recreated from secondary SP 613, which is itself dependent upon frame 609 in stream 603, if frame 605 is lost or corrupted. Note that the switching is only from stream 603 to stream 601; the inverse is not supported.

Figure 6B:
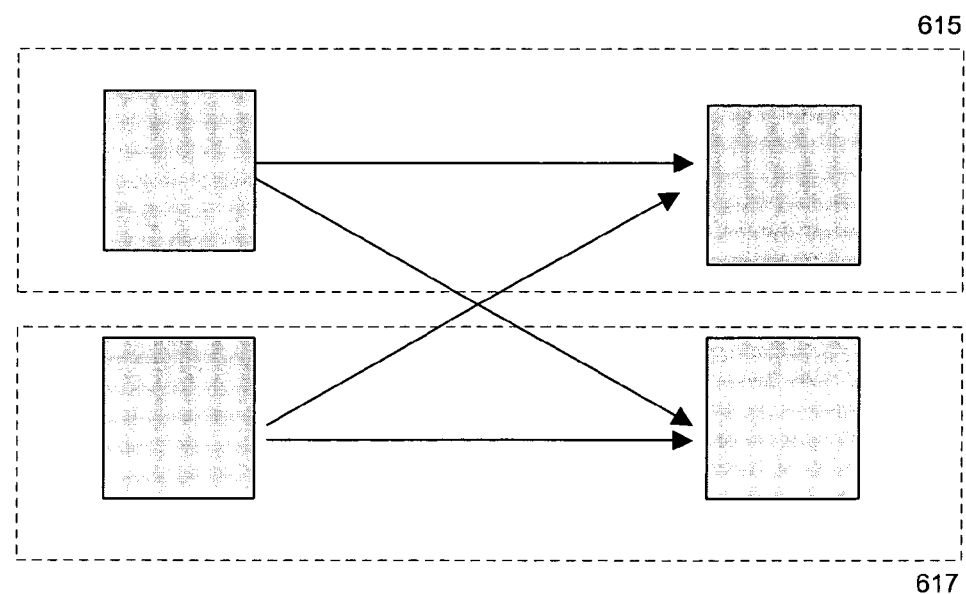

In contrast, FIG. 6B illustrates the switching between streams 615, 617 when the encoder/decoder incorporates the adaptive joint source channel coding of the present invention. Because the decoder works with multiple received predictors, no switch picture points are required. When switching from a higher to a lower rate stream, the result appears to the decoder as if some of the predictors have been lost. Furthermore, the switching can occur from stream 615 to 617 as well as from stream 617 to stream 615.

In an alternate implementation, assume streams 615, 617 represent odd and even frames being sent through different transmission paths. If one of the transmission paths fails, those frames can be recovered from the other stream.

Figure 7A:
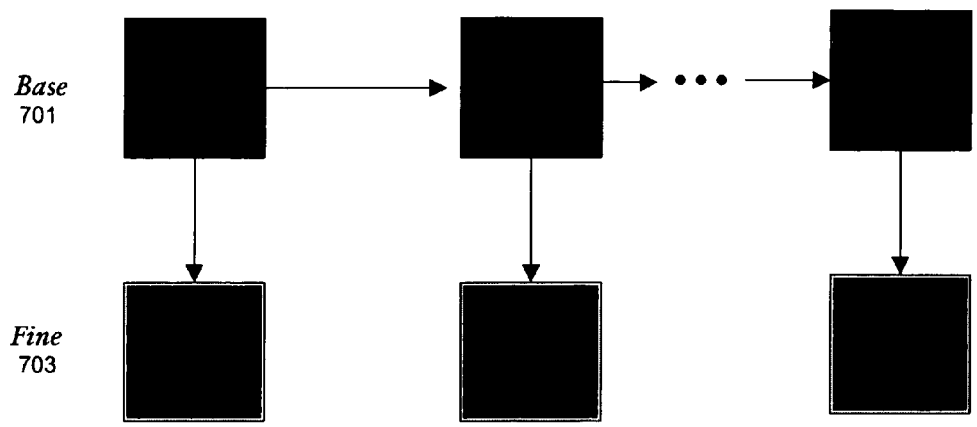
FIG. 7A-B are diagrams contrasting the prior art and an embodiment of the invention implemented for spatially scalable coding.
Figure 7B:
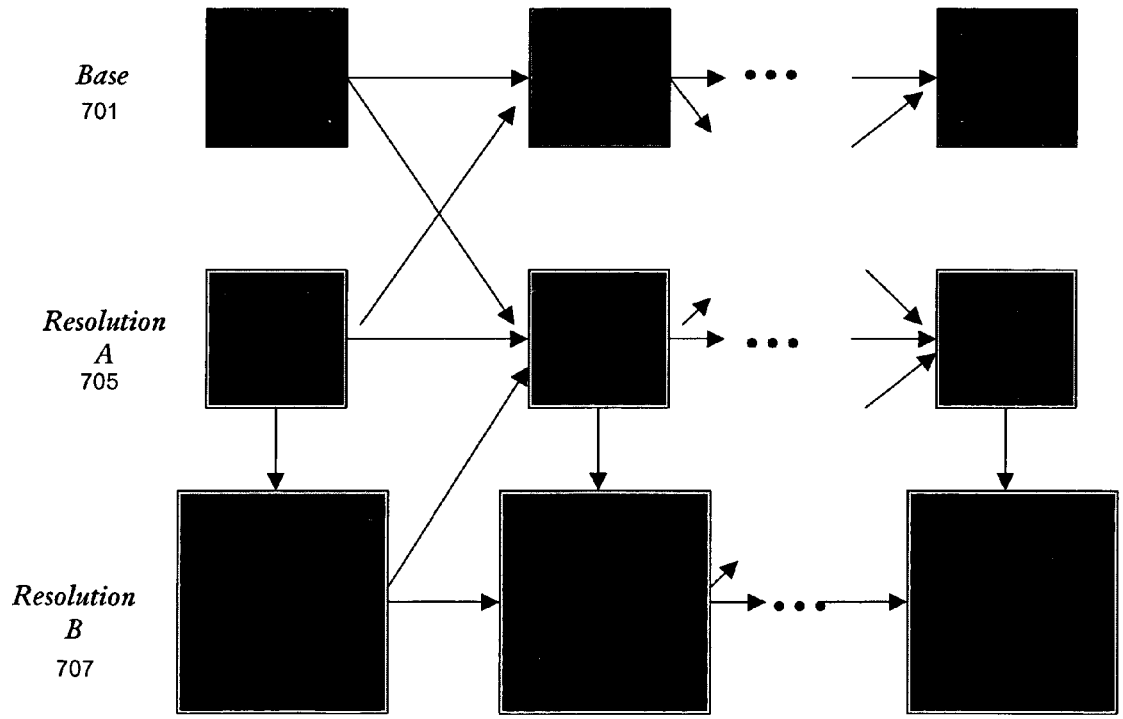

FIGS. 7A-B illustrate the difference between scalability in the prior art and in accordance with adaptive joint source channel coding of the present invention. Previously, a finer granularity stream 703 could be created from a base stream 701 to provide SNR scalability. However, each frame in the stream 701 depended only upon a previous frame in the stream 701 to prevent drift. Furthermore, each frame in stream 703 depended from a single frame in the stream 701, and there was no interdependency among the frames in stream 703. As shown in FIG. 7B, incorporating adaptive source channel coding allows the frames in stream 705 to depend from both the base stream 701 and previous frames in stream 705. In addition, the frames in base stream 701 can depend upon the frames in stream 705. A further enhancement stream 707 can be created from stream 705, and the frames in stream 705 can be dependent upon those in stream 707 as well as the frames in base stream 701 to provide spatial scalability. For example, stream 705 may be a low resolution stream suitable for cell phones, while stream 707 may be a high resolution stream suitable for television. Thus, once a stream of a particular resolution has been encoded, a stream of a higher resolution can up-sampled from it. The tree structure codebook of FIG. 3 can be used to encode at a given SNR/spatial resolution by starting at the level that meets the scaling requirements and moving down the tree. More identifier bits allows for a coarser prediction, while refinement information can be sent by specifying bits to refine the value of the quantized coefficients.

Figure 8:
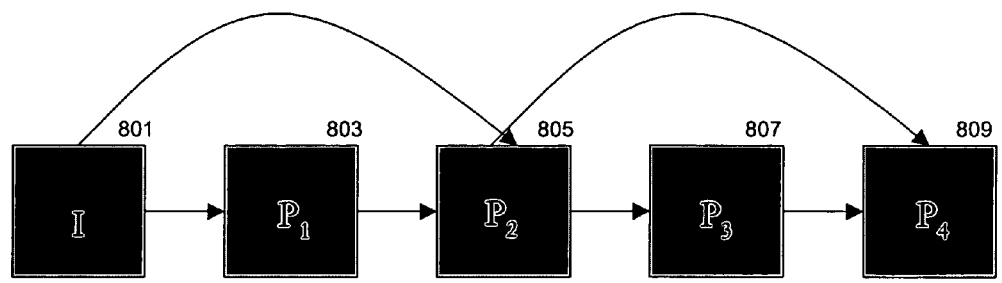
FIG. 8 is a diagram illustrating an embodiment of the invention implemented for temporal scalable coding.

FIG. 8 illustrates how the adaptive joint source channel coding may be implemented with I and P video frames to provide temporal scalability. As known in the art, infra or I-frames contain all the data for a particular frame while P-frames are predicted from previous frames. As shown, a first prediction path extends from I-frame 801 to P-frame 803, from P-frame 803 to P-frame 805, etc. In addition, there is a second prediction path that skips over every other P-frame so half-frame rate temporal scalability can be accomplished by predicting P-frames based on both the first and second prediction paths. It will be appreciated that other frame rate resolutions can be performed by changing the prediction paths between the frames. It will be appreciated that the implementation described in FIG. 8 can be used with a video stream that contains B-frames as well as P-frames (often collectively referred to as delta frames) to achieve backwards temporal scalability.

Figure 9:
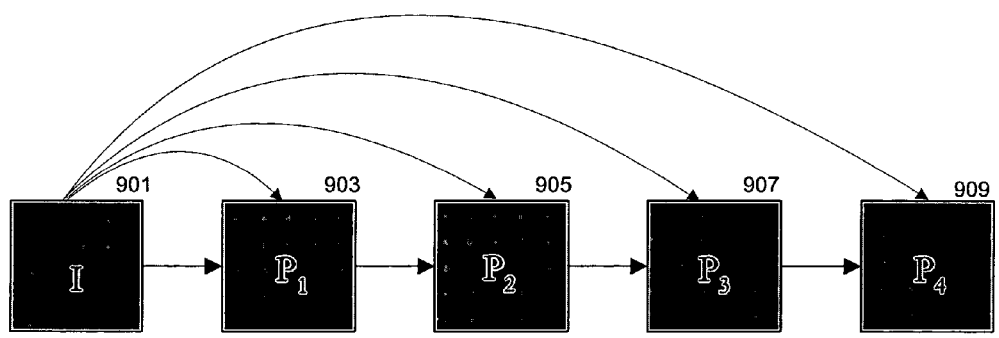
FIG. 9 is a diagram illustrating of an embodiment of the invention implemented for random access.

FIG. 9 illustrates how the adaptive joint source channel coding may be implemented with I and P (and/or B) video frames to provide random access into a video stream. By providing a prediction path from I-frame 901 to each P-frame 903, 905, 907, 909, the bit stream can be accessed at random points if the I-frame 901 is available. Similarly, in addition to forward random access, establishing prediction paths from future I-frames will allow for backwards random access.

Figure 10:
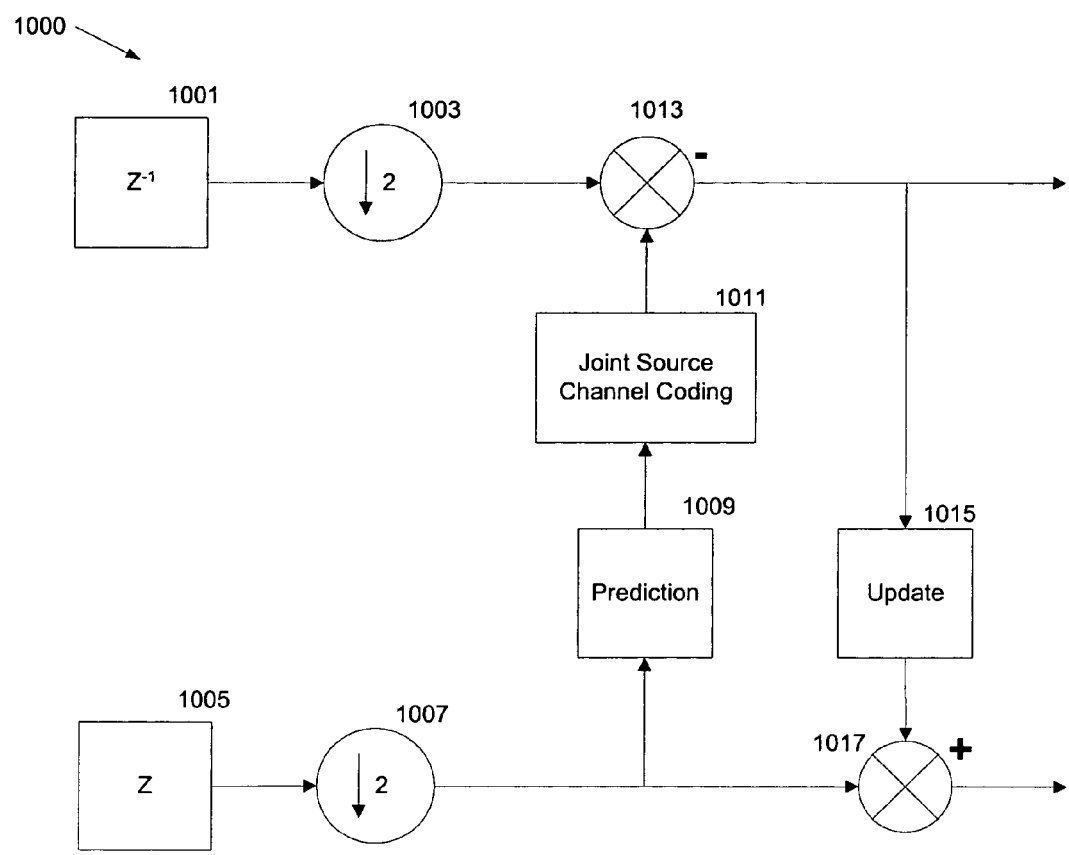
FIG. 10 is a diagram illustrating an embodiment of the invention implemented in a lifting scheme.
Figure 11A:
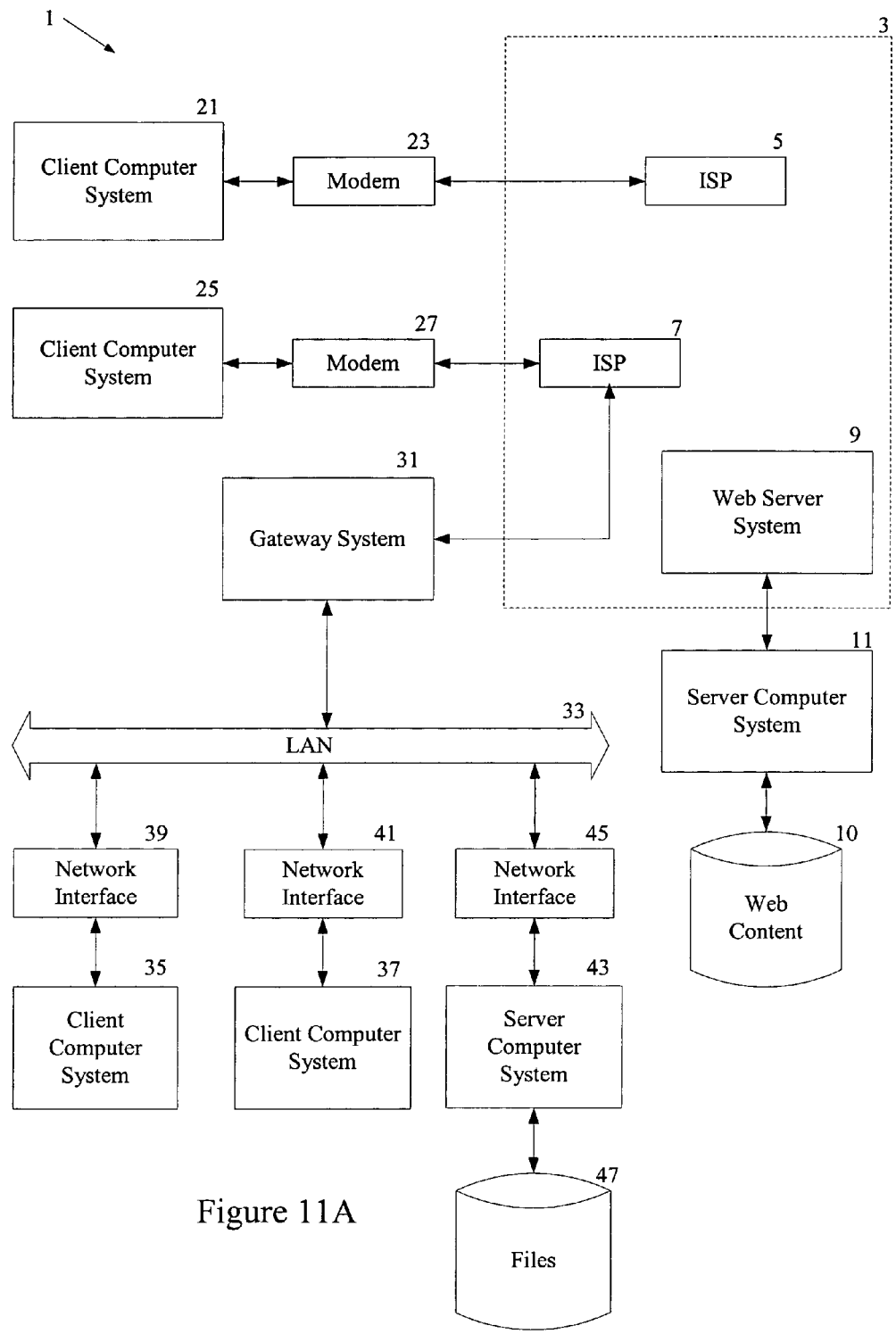
FIG. 11A is a diagram of one embodiment of an operating environment suitable for practicing the present invention.
Figure 11B:
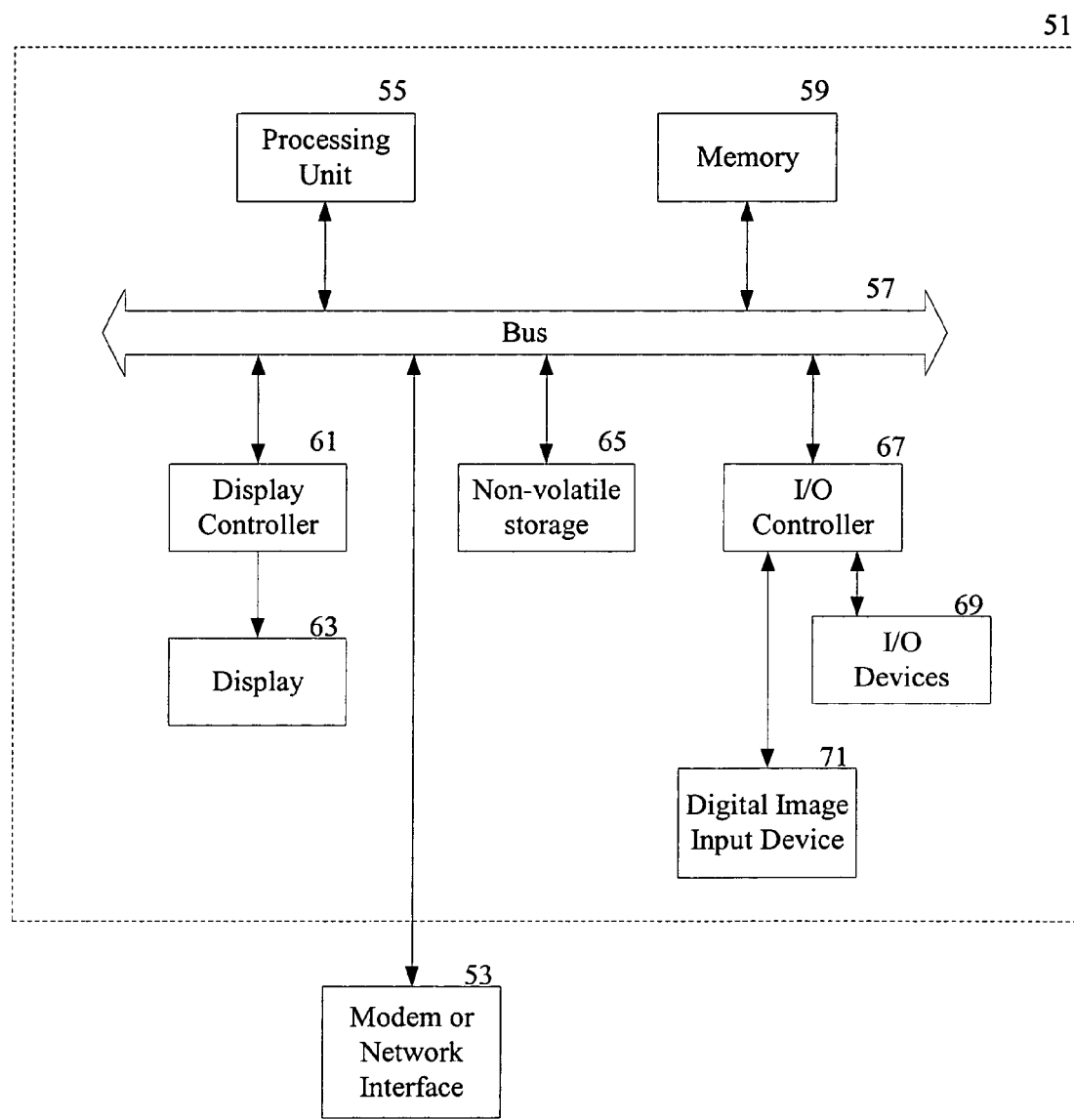
FIG. 11B is a diagram of one embodiment of a computer system suitable for use in the operating environment of FIG. 11A.

FIG. 10 illustrates the use of the adaptive joint source channel coding within the framework of a lifting scheme 1000 for discrete wavelet transformation. In the prior art, the previous frame 1001 is split 1003 into two subsets and a prediction operation 1009 uses each of the subsets to predict the corresponding subset (split 1007) in the current frame 1005. The wavelet coefficient is the prediction error, i.e., the difference 1013 between the predictor and the current data. An update operation 1015 is applied to the wavelet coefficients and the result is added 1017 into the subset for the current frame to create scaling coefficients. By inserting adaptive joint source channel coding 1011 between the prediction operation 1009 and the difference operation 1013, the resulting the wavelets coefficients will be based on a decoding sphere that encompasses multiple predictors. When the split is on low and high pass components, the use of adaptive joint source channel coding allows for the correction of drift in the low pass components. The lifting scheme 1000 is particularly useful for encoder/decoder mismatch and coding across GOPs (groups of pictures).

The following description of FIGS. 10A-B is intended to provide an overview of computer hardware and other operating components suitable for performing the methods of the invention described above, but is not intended to limit the applicable environments. One of skill in the art will immediately appreciate that the embodiments of the invention can be practiced with other computer system configurations, including hand-held devices, multiprocessor systems, microprocessor-based or programmable consumer electronics, network PCs, minicomputers, mainframe computers, and the like. The embodiments of the invention can also be practiced in distributed computing environments where tasks are performed by remote processing devices that are linked through a communications network, such as peer-to-peer network infrastructure.

FIG. 10A shows several computer systems 1 that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 10A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, a network computer, a Web TV system, a handheld device, or other such computer system. Similarly, the ISP 7 provides Internet connectivity for client systems 25, 35, and 37, although as shown in FIG. 10A, the connections are not the same for these three computer systems. Client computer system 25 is coupled through a modem interface 27 while client computer systems 35 and 37 are part of a LAN. While FIG. 10A shows the interfaces 23 and 27 as generically as a "modem," it will be appreciated that each of these interfaces can be an analog modem, ISDN modem, cable modem, satellite transmission interface, or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31. Furthermore, any combination of client systems 21, 25, 35, 37 may be connected together in a peer-to-peer network using LAN 33, Internet 3 or a combination as a communications medium. Generally, a peer-to-peer network distributes data across a network of multiple machines for storage and retrieval without the use of a central server or servers. Thus, each peer network node may incorporate the functions of both the client and the server described above.

FIG. 10B shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface, or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display (LCD). The input/output devices 69 can include a keyboard, disk drives, printers, a scanner, and other input and output devices, including a mouse or other pointing device. The display controller 61 and the I/O controller 67 can be implemented with conventional well known technology. A digital image input device 71 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the terms "computer-readable medium" and "machine-readable medium" include any type of storage device that is accessible by the processor 55 and also encompass a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the embodiments of the present invention. Network computers do not usually include a hard disk or other mass storage, and the executable programs are loaded from a network connection into the memory 59 for execution by the processor 55. A Web TV system, which is known in the art, is also considered to be a computer system according to the embodiments of the present invention, but it may lack some of the features shown in FIG. 10B, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 65 and causes the processor 55 to execute the various acts required by the operating system to input and output data and to store data in memory, including storing files on the non-volatile storage 65.

Adaptive joint source channel coding has been described. Although the invention as been described with reference to specific embodiments illustrated herein, this description is not intended to be construed in a limiting sense. It will be appreciated by those of ordinary skill in the art that any arrangement which is calculated to achieve the same purpose may be substituted for the specific embodiments shown and is deemed to lie within the scope of the invention. Accordingly, this application is intended to cover any such adaptations or variations of the present invention. Therefore, it is manifestly intended that this invention be limited only by the following claims and equivalents thereof.

What is claimed is:

1. A computerized method comprising:
    selecting, by an encoding device, multiple predictors for a single reference unit of correlated data, the multiple predictors located within a decoding region centered on the single reference unit in an n-dimensional coordinate space and comprising other data units in the correlated data;
    determining a sub-codebook for the decoding region in which each of the multiple predictors within the decoding region is decodable to recreate the entire single reference unit without any of the other multiple predictors, the sub-codebook having an identifier that further specifies the decoding region;
    transmitting the multiple predictors to a separate decoder; and
    transmitting the identifier for the sub-codebook as the compressed representation of the single reference unit, wherein the separate decoder recreates the entire single reference unit using the identified sub-codebook to decode any one of the multiple predictors within the specified decoding region that are correctly received by the separate decoder.

2. The computerized method of claim 1, wherein determining a sub-codebook comprises:
    partitioning a codebook until the sub-codebook is created.

3. The computerized method of claim 2, wherein the codebook comprises lattice partitions.

4. The computerized method of claim 1 further comprising:
    determining that none of the multiple predictors were correctly received for decoding;
    selecting an additional predictor; and
    determining a new sub-codebook that decodes the additional predictor to the reference frame.

5. The computerized method of claim 4 further comprising:
    sending an additional identifier for the new sub-codebook.

6. The computerized method of claim 5, wherein the additional identifier combines with the identifier for the sub-codebook to identify the new sub-codebook.

7. The computerized method of claim 1, wherein the predictors are selected based on a maximum error calculation.

8. The computerized method of claim 1, wherein the reference unit is a frame in a video stream and the predictors are selected from past and future frames in the video stream.

9. The computerized method of claim 1, wherein the reference unit is a frame in a first video stream and the predictors are selected from frames in the first video stream and frames in a second video stream.

10. The computerized method of claim 1, wherein the reference unit is a frame in a first channel and the predictors are selected from frames in the first channel and frames in a second channel.

11. The computerized method of claim 1, wherein the reference unit is a frame at a first resolution and the predictors are selected from frames at a second resolution.

12. The computerized method of claim 1, wherein the reference unit is a delta frame in a video stream and the predictors are selected from an intraframe and other delta frames.

13. The computerized method of claim 1, wherein the reference unit is a delta frame in a video stream and one of the predictors is an intraframe.

14. The computerized method of claim 1, wherein the identifier is used in place of a prediction error in a lifting scheme for discrete wavelet transformation.

15. The computerized method of claim 1 further comprising:
receiving the identifier; and
decoding the reference unit from a correctly received predictor using the sub-codebook identified by the identifier.

16. The computerized method of claim 1 further comprising:
estimating the predictors if no predictors are correctly received; and
decoding the reference unit from a weighted combination of the estimated predictors using the sub-codebook identified by the identifier.

17. The computerized method of claim 1 further comprising:
receiving an additional identifier for a new sub-codebook; and
decoding the reference unit from an additional predictor and the new sub-codebook.

18. The computerized method of claim 1 further comprising:
determining erroneous predictors based on decoding a forbidden symbol in a stream of units encoded using arithmetic coding.

19. The computerized method of claim 18, wherein the erroneous predictors are determined according to $1/\epsilon$, where $\epsilon$ represents a probability that the forbidden symbol will occur in the stream.

20. A computerized method comprising:
receiving, by an encoder from separate encoding device, an identifier as a compressed representation of a single reference unit, the identifier specifying a decoding region centered on the single reference unit within an n-dimensional coordinate space and further corresponding to a sub-codebook for the decoding region in which each of multiple predictors located within the decoding region is decodable to recreate the entire single reference unit without any of the other multiple predictors;
receiving the multiple predictors, wherein fewer than all of the multiple predictors within the decoding region are correctly received; and
recreating the entire single reference unit using the identified sub-codebook to decode any one of the correctly received multiple predictors.

21. The computerized method of claim 20 further comprising:
estimating the predictors if no predictors are correctly received; and
decoding the reference unit from a weighted combination of the estimated predictors using the sub-codebook identified by the identifier.

22. The computerized method of claim 20 further comprising:
receiving an identifier for a new sub-codebook; and
decoding the reference unit from an additional predictor and the new sub-codebook.

23. A machine-readable non-transitory storage medium storing instructions which when executed by a processor cause the processor to execute a method comprising:
selecting, by an encoder, multiple predictors for a single reference unit of correlated data, the multiple predictors located within a decoding region centered on the single reference unit in an n-dimensional coordinate space and comprising other data units in the correlated data;
determining a sub-codebook for the decoding region in which each of the multiple predictors within the decoding region is decodable to recreate the entire single reference unit without any of the other multiple predictors, the sub-codebook having an identifier that further specified the decoding region;
transmitting the multiple predictors to a separate decoder; and
transmitting the identifier for the sub-codebook as the compressed representation of the single reference unit, wherein the separate decoder recreates the entire single reference unit using the identified sub-codebook to decode any one of the multiple predictors within the specified decoding region that are correctly received by the separate decoder.

24. The machine-readable non-transitory storage medium of claim 23, wherein determining a sub-codebook comprises:
partitioning a codebook until the sub-codebook is created.

25. The machine-readable non-transitory storage medium of claim 24, wherein the codebook comprises lattice partitions.

26. The machine-readable non-transitory storage medium of claim 23, wherein the method further comprises:
determining that none of the multiple predictors were correctly received for decoding;
selecting an additional predictor; and
determining a new sub-codebook that decodes the additional predictor to the reference frame.

27. The machine-readable non-transitory storage medium of claim 26, wherein the method further comprises:
sending an additional identifier for the new sub-codebook.

28. The machine-readable non-transitory storage medium of claim 27, wherein the additional identifier combines with the identifier for the sub-codebook to identify the new sub-codebook.

29. The machine-readable non-transitory storage medium of claim 23, wherein the predictors are selected based on a maximum error calculation.

30. The machine-readable non-transitory storage medium of claim 23, wherein the method further comprises:
receiving the identifier; and
decoding the reference unit from a correctly received predictor using the sub-codebook identified by the identifier.

31. The machine-readable non-transitory storage medium of claim 23, wherein the method further comprises:
estimating the predictors if no predictors are correctly received; and
decoding the reference unit from a weighted combination of the estimated predictors using the sub-codebook identified by the identifier.

32. The machine-readable non-transitory storage medium of claim 23, wherein the method further comprises:
receiving an additional identifier for a new sub-codebook; and
decoding the reference unit from an additional predictor and the new sub-codebook.

33. A machine-readable non-transitory storage medium storing instructions which when executed by a processor cause the processor to execute a method comprising:
receiving, by a decoder from a separate encoder, an identifier as a compressed representation of a single reference unit, the identifier specifying a decoding region centered on the single reference unit within an n-dimensional coordinate space and further corresponding to a sub-codebook for the decoding region in which each of multiple predictors located within the decoding region is decodable to recreate the entire single reference unit without any of the other multiple predictors;

receiving the multiple predictors, wherein fewer than all of the multiple predictors within the decoding region are correctly received; and recreating the entire single reference unit using the identified sub-codebook to decode any one of the correctly received multiple predictors.

34. The machine-readable non-transitory storage medium of claim 33, wherein the method further comprises:

estimating the predictors if no predictors are correctly received; and decoding the reference unit from a weighted combination of the estimated predictors using the sub-codebook identified by the identifier.

35. The machine-readable non-transitory storage medium of claim 33, wherein the method further comprises:

receiving an additional identifier for a new sub-codebook; and decoding the reference unit from an additional predictor and the new sub-codebook.

36. A system comprising:

a processor coupled to a memory through a bus; and an encoding process executed by the processor from the memory to cause the processor to execute as an encoder to select, multiple predictors for a single reference unit of correlated data, the multiple predictors located within a decoding region centered on the single reference unit in an n-dimensional coordinate space and comprising other data units in the correlated data, determine a sub-codebook for the decoding region in which each of the multiple predictors within the decoding region is decodable to recreate the entire single reference unit without any of the other multiple predictors, the sub-codebook having an identifier that further specifies the decoding region, transmit the multiple predictors to a separate decoder, and transmit the identifier for the sub-codebook as the compressed representation of the single reference unit, wherein the separate decoder recreates the entire single reference unit using the identified sub-codebook to decode any one of the multiple predictors within the specified decoding region that are correctly received by the separate decoder.

37. The system of claim 36, wherein the encoding process further causes the processor to partition a codebook until the sub-codebook is created when determining a sub-codebook.

38. The system of claim 37, wherein the codebook comprises lattice partitions.

39. The system of claim 36, wherein the encoding process further causes the processor to determine that none of the multiple predictors were correctly received for decoding, select an additional predictor, and determine a new sub-codebook that decodes the additional predictor to the reference frame.

40. The system of claim 39, wherein the encoding process further causes the processor to send an additional identifier for the new sub-codebook.

41. The system of claim 40, wherein the additional identifier combines with the identifier for the sub-codebook to identify the new sub-codebook.

42. The system of claim 36, wherein the predictors are selected based on a maximum error calculation.

43. A system comprising:

a processor coupled to a memory through a bus; and a decoding process executed from the memory by the processor to cause the processor execute as a decoder to receive, from a separate encoder, an identifier as a compressed representation of a single reference unit, the identifier specifying a decoding region centered on the single reference unit within an n-dimensional coordinate space and further corresponding to a sub-codebook for the decoding region in which each of multiple predictors located within the decoding region is decodable to recreate the entire single reference unit without any of the other multiple predictors, to receive the multiple predictors, wherein fewer than all of the multiple predictors are received correctly, and recreate the entire single reference unit using the identified sub-codebook to decode any one of the correctly received multiple predictors.

44. The system of claim 43, wherein the decoding process further causes the processor to estimate the predictors if no predictors are correctly received, and decode the reference unit from a weighted combination of the estimated predictors using the sub-codebook identified by the identifier.

45. The system of claim 43, wherein the decoding process further causes the processor to receive an additional identifier for a new sub-codebook, and decode the reference unit from an additional predictor and the new sub-codebook.

46. An apparatus comprising:

means for selecting, by an encoder means, multiple predictors for a single reference unit of correlated data, the multiple predictors located within a decoding region centered on the single reference unit in an n-dimensional coordinate space and comprising data units in the correlated data;

means for determining a sub-codebook for the decoding region in which each of the multiple predictors within the decoding region is decodable to recreate the entire single reference unit without any of the other multiple predictors, the sub-codebook having an identifier that further specifies the decoding region;

means for transmitting the multiple predictors to a separate decoder means; and means for transmitting the identifier for the sub-codebook as the compressed representation of the single reference unit, wherein the separate decoder recreates the entire single reference unit using the identified sub-codebook to decode any one of the multiple predictors within the specified decoding region that is correctly received by the separate decoder.

47. The apparatus of claim 46, wherein the means for determining a sub-codebook comprises:

means for partitioning a codebook until the sub-codebook is created.

48. The apparatus of claim 47, wherein the codebook comprises lattice partitions.

49. The apparatus of claim 46 further comprising::

means for determining that none of the multiple predictors were correctly received for decoding;

means for selecting an additional predictor; and means for determining a new sub-codebook that decodes the additional predictor to the reference frame.

50. The apparatus of claim 49 further comprising:

means for sending an additional identifier for the new sub-codebook.

51. The apparatus of claim 50, wherein the additional identifier combines with the identifier for the sub-codebook to identify the new sub-codebook.

52. The apparatus of claim 46, wherein the predictors are selected based on a maximum error calculation.

53. An apparatus comprising:
means for receiving, by a decoder means from a separate encoder means, an identifier as a compressed representation of a single reference unit, the identifier specifying a decoding region centered on the single reference unit within an n-dimensional coordinate space and further corresponding to a sub-codebook for the decoding region in which each of multiple predictors located within the decoding region is decodable to recreate the entire single reference unit without any of the other multiple predictors;
means for receiving the multiple predictors, wherein fewer than all of the multiple predictors are correctly received; and
means for recreating the entire single reference unit using the identified sub-codebook to decode any one of the correctly received multiple predictors.

54. The apparatus of claim 53 further comprising:
means for estimating the predictors if no predictors are correctly received; and
means for decoding the reference unit from a weighted combination of the estimated predictors using the sub-codebook identified by the identifier.

55. The apparatus of claim 53 further comprising:
means for receiving an additional identifier for a new sub-codebook; and
means for decoding the reference unit from an additional predictor and the new sub-codebook.

56. The computerized method of claim 1, wherein the decoding region is a sphere and the identifier for the sub-codebook comprises an encoded value of a radius of the sphere.

57. The computerized method of claim 20, wherein the decoding region is a sphere and the identifier for the sub-codebook comprises an encoded value of a radius of the sphere.

58. The machine-readable non-transitory storage medium of claim 23, wherein the decoding region is a sphere and the identifier for the sub-codebook comprises an encoded value of a radius of the sphere.

59. The machine-readable non-transitory storage medium of claim 33, wherein the decoding region is a sphere and the identifier for the sub-codebook comprises an encoded value of a radius of the sphere.

60. The system of claim 36, wherein the decoding region is a sphere and the identifier for the sub-codebook comprises an encoded value of a radius of the sphere.

61. The system of claim 43, wherein the decoding region is a sphere and the identifier for the sub-codebook comprises an encoded value of a radius of the sphere.

62. The apparatus of claim 46, wherein the decoding region is a sphere and the identifier for the sub-codebook comprises an encoded value of a radius of the sphere.

63. The apparatus of claim 53, wherein the decoding region is a sphere and the identifier for the sub-codebook comprises an encoded value of a radius of the sphere.

* * * * *